(12) United States Patent
Phane (10) Patent No.: US 7,748,095 B1
(45) Date of Patent: Jul. 6, 2010

(54) BRAKE PISTON SYSTEM (76) Inventor: Huguens Phane, 46 Colonial Ave., Dorchester, MA (US) 02124

( * ) Notice: Subject to any disclaimer, the term of this patent is extended or adjusted under 35 U.S.C. 154(b) by 375 days.

(21) Appl. No.: 11/844,045

(22) Filed: Aug. 23, 2007

(51) Int. Cl.
*B23P 19/04* (2006.01)
(52) U.S. Cl. .......................... 29/239; 29/888.01; 269/6
(58) Field of Classification Search .................. 29/239, 29/270, 888.011, 266, 278; 269/3, 6; 254/108
See application file for complete search history.

(56) References Cited

U.S. PATENT DOCUMENTS

| | | | | |
|---|---|---|---|---|
| 2,768,664 A * | 10/1956 | Morgan | ...................... | 269/203 |
| 2,867,003 A * | 1/1959 | Stiles | ........................... | 249/82 |
| 3,052,462 A * | 9/1962 | Butler | ........................ | 269/249 |
| 3,727,490 A | 4/1973 | Diffenderfer et al. | | |
| 4,086,828 A | 5/1978 | Mader | | |
| D365,735 S | 1/1996 | Fells | | |
| 6,029,964 A * | 2/2000 | Bohl | ............................. | 269/6 |
| 6,523,238 B1 | 2/2003 | Priddy | | |
| 6,585,243 B1 | 7/2003 | Li | | |
| 6,678,931 B1 * | 1/2004 | Tatasciore | ..................... | 29/239 |
| 6,874,217 B2 * | 4/2005 | Ploeger et al. | ................ | 29/239 |
| 7,155,792 B1 * | 1/2007 | Miller, Jr. | ..................... | 29/239 |
| 7,194,948 B2 * | 3/2007 | Liu | .............................. | 91/454 |
| 2004/0255445 A1 * | 12/2004 | Ploeger et al. | ................ | 29/239 |
| 2005/0015979 A1 * | 1/2005 | Walters et al. | .......... | 29/888.011 |

* cited by examiner

*Primary Examiner*—Lee D Wilson (57) ABSTRACT

A brake piston system for pushing a brake piston into a brake caliper includes a housing including a handle section and a main section is coupled to the handle section. The handle section is graspable by a person. A backing plate is coupled to a front end of the housing. The backing plate is abutted against a front plate of the brake caliper. A ram assembly is mounted to the housing and extends through the backing plate. The ram assembly is abuttable against the brake piston of the brake caliper when the backing plate is abutted against the front plate. The ram assembly is actuated to push against the brake piston and force the brake piston into the brake caliper. An actuation assembly is coupled to the housing. The actuation assembly is actuated to actuate the ram assembly to advance the brake piston into the brake caliper.

16 Claims, 7 Drawing Sheets

BRAKE PISTON SYSTEM

BACKGROUND OF THE INVENTION

1. Field of the Invention

The present invention relates to brake pad spreaders and more particularly pertains to a new brake pad spreader for pushing a brake piston into a brake caliper.

2. Description of the Prior Art

The use of brake pad spreaders is known in the prior art. While these devices fulfill their respective, particular objectives and requirements, the need remains for a system that has certain improved features that allows for a rod of the system to rotate to drive a brake piston into a brake caliper and inhibit the brake piston inadvertently forcing the rod back. Additionally, the system should include an abutment plate that is pivotally coupled to a rod to allow the rod to rotate without rotating the abutment plate against the brake piston.

SUMMARY OF THE INVENTION

The present invention meets the needs presented above by generally comprising a housing including a handle section and a main section is coupled to the handle section. The handle section is graspable by a person. The main section is positioned approximately perpendicular to the handle section. A backing plate is coupled to a front end of the housing. The backing plate is abutted against a front plate of the brake caliper. A ram assembly is mounted to the housing and extends through the backing plate. The ram assembly is abuttable against the brake piston of the brake caliper when the backing plate is abutted against the front plate. The ram assembly is actuated to push against the brake piston and force the brake piston into the brake caliper. An actuation assembly is coupled to the housing. The actuation assembly is actuated to actuate the ram assembly to advance the brake piston into the brake caliper. The actuation assembly is coupled to the handle section of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 10 thereof, a new brake pad spreader embodying the principles and concepts of the present invention and generally designated by the reference numeral 10 will be described.

As best illustrated in FIGS. 1 through 10, the brake piston system 10 generally comprises a housing 12 including a handle section 14 and a main section 16 is coupled to the handle section 14. The handle section 14 is graspable by a person. The main section 16 is positioned approximately perpendicular to the handle section 14. A backing plate 18 is coupled to a front end 20 of the housing 12. The backing plate 18 is abutted against a front plate 1 of a brake caliper 2.

A ram assembly 22 is mounted to the housing 12 and extends through the backing plate 18. The ram assembly 22 is abuttable against a brake piston 3 of the brake caliper 2 when the backing plate 18 is abutted against the backing plate 18. The ram assembly 22 is actuated to push against the brake piston 3 and force the brake piston 3 into the brake caliper 2. The ram assembly 22 includes a rod 24 that extends through the main section 16 of the housing 12.

The rod 24 includes a threaded section 26 and a toothed section 27. The threaded section 26 is threaded through the backing plate 18 and the front end 20 of the housing 12. The toothed section 27 extends through a rear end 28 of the housing 12. The toothed section 27 includes a plurality of drive teeth 30 radiating outwardly from the rod 24. Each of the drive teeth 30 includes a flat surface 32 and an angled surface 34. The flat surface 32 extends approximately perpendicular to an outer surface of the rod 24. The angled surface 34 extends at an angle between approximately 35 degrees and 50 degrees.

The ram assembly 22 also includes an abutment plate 36 pivotally coupled to a forward end 38 of the rod 24. The abutment plate 36 is abutted against the brake piston 3 when the backing plate 18 is abutted against the front plate 1 of the brake caliper 2. The abutment plate 36 is advanced away from the backing plate 18 to force the brake piston 3 into the brake caliper 2 when the rod 24 is rotated in a first direction. The abutment plate 36 is retracted towards the backing plate 18 when the rod 24 is rotated in a second direction. A grip 40 is coupled to a rearward end 42 of the rod 24 opposite the abutment plate 36. The grip 40 is rotated to rotate the rod 24 in the second direction when the abutment plate 36 is to be retracted from the brake piston 3.

An actuation assembly 44 is coupled to the housing 12. The actuation assembly 44 is actuated to actuate the ram assembly 22 to advance the brake piston 3 into the brake caliper 2. The actuation assembly 44 is coupled to the handle section 14 of the housing 12. The actuation assembly 44 includes an advancing bar 46 slidably coupled to the housing 12. The advancing bar 46 includes a plurality of pawl teeth 48. The pawl teeth 48 mesh with the toothed section 27 of the rod 24 to rotate the rod 24 in the first direction when the advancing bar 46 is slid towards the rod 24. The pawl teeth 48 slide over the toothed section 27 when the advancing bar 46 is slid away from the rod 24.

Each of the pawl teeth 48 has a flat face 50 and an angled face 52. The flat face 50 of each of the pawl teeth 48 faces a bottom end 54 of the advancing bar 46. The angled face 52 is positioned at an angle between approximately 40 degrees and 50 degrees. The flat face 50 abuts the flat surface 32 of the drive teeth 30 of the toothed section 27 to rotate the rod 24 in the first direction. The angled face 52 of each of the pawl teeth 48 are slid over the angled surface 34 of the drive teeth 30 to permit the pawl teeth 48 to slide over the drive teeth 30 of the toothed section 27.

The actuation assembly 44 also includes a trigger 56 pivotally coupled to the housing 12. The trigger 56 is pivotally coupled to and extends through the handle section 14. The trigger 56 abuts against a flange 58 of the advancing bar 46. The trigger 56 slides the advancing bar 46 toward the rod 24 when the trigger 56 is actuated. An urging member 60 is coupled to the advancing bar 46 and extends between the flange 58 of the advancing bar 46 and the housing 12. The urging member 60 urges the advancing bar 46 away from the rod 24 when the trigger 56 is released. A stop collar 62 is coupled to the advancing bar 46 and is positioned adjacent an exterior end 64 of the advancing bar 46. The stop collar 62 abuts against the housing 12 to restrict the movement of the advancing bar 46 away from the rod 24 when the trigger 56 is released.

A restricting assembly 66 is coupled to the housing 12. The restricting assembly 66 inhibits retraction of the ram assembly 22 from the brake piston 3. The restricting assembly 66 is actuated to permit the ram assembly 22 to be retracted from the brake piston 3. The restricting assembly 66 includes a pawl 68 slidably coupled to the housing 12. The pawl 68 abuts against the flat surface 32 of one of the drive teeth 30 of the toothed section 27 of the rod 24 to inhibit rotation of the rod 24 in the second direction. A retraction bar 70 is coupled to the pawl 68 and extends from the housing 12. The retraction bar 70 slides the pawl 68 away from the rod 24 to permit rotation of the rod 24 in the second direction when retraction bar 70 is actuated.

The restricting assembly 66 additionally includes a biasing member 72 coupled to the pawl 68 and that extends between the pawl 68 and the housing 12. The biasing member 72 biases the pawl 68 against the toothed section 27 of the rod 24 when the retraction bar 70 is released. The restricting assembly 66 is positioned adjacent the rod 24 to allow the restricting assembly 66 to be actuated while the rod 24 is rotated in the second direction. The restricting assembly 66 is positioned in the rear end 28 of the housing 12.

Figure 1:
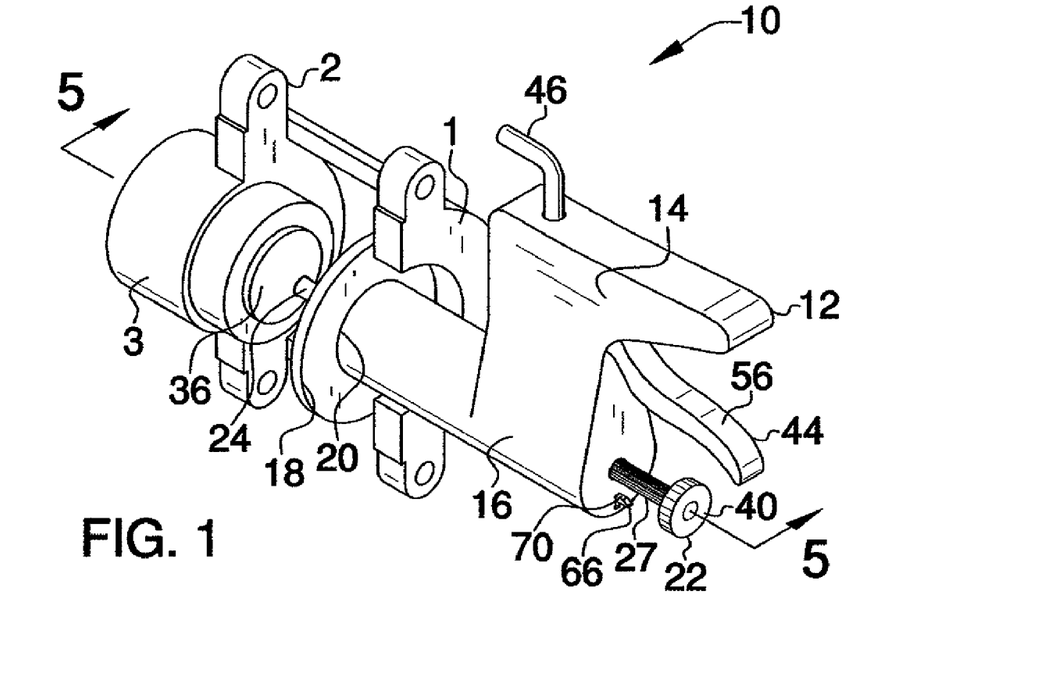
FIG. 1 is a perspective view of a brake piston system according to the present invention shown in use with the brake piston extended from the brake caliper.
Figure 2:
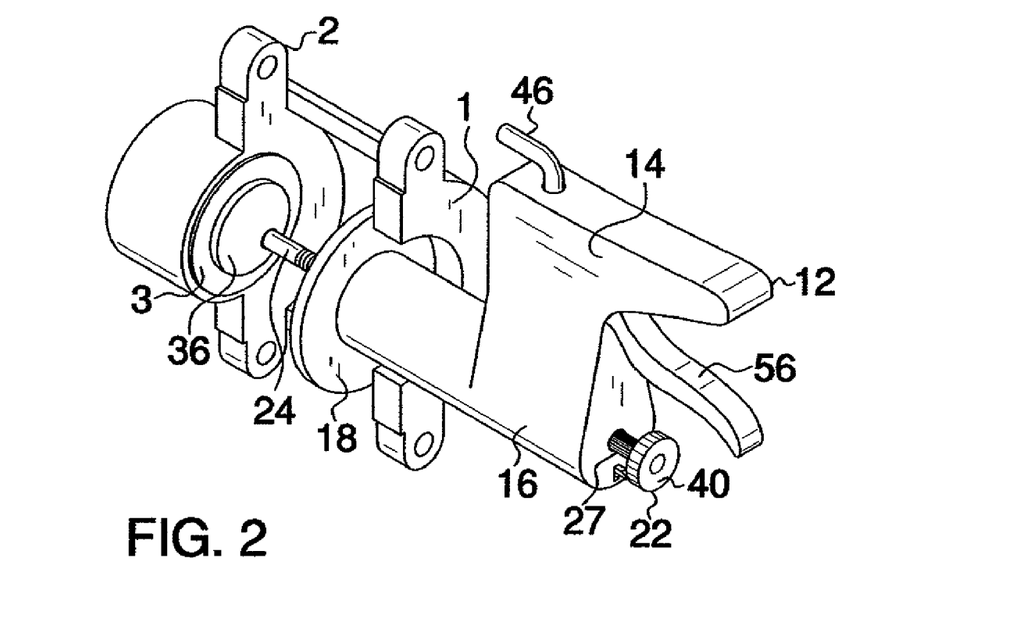
FIG. 2 is a perspective view of the present invention shown in use pushing the brake piston pushed into the brake caliper.
Figures 3, 4:
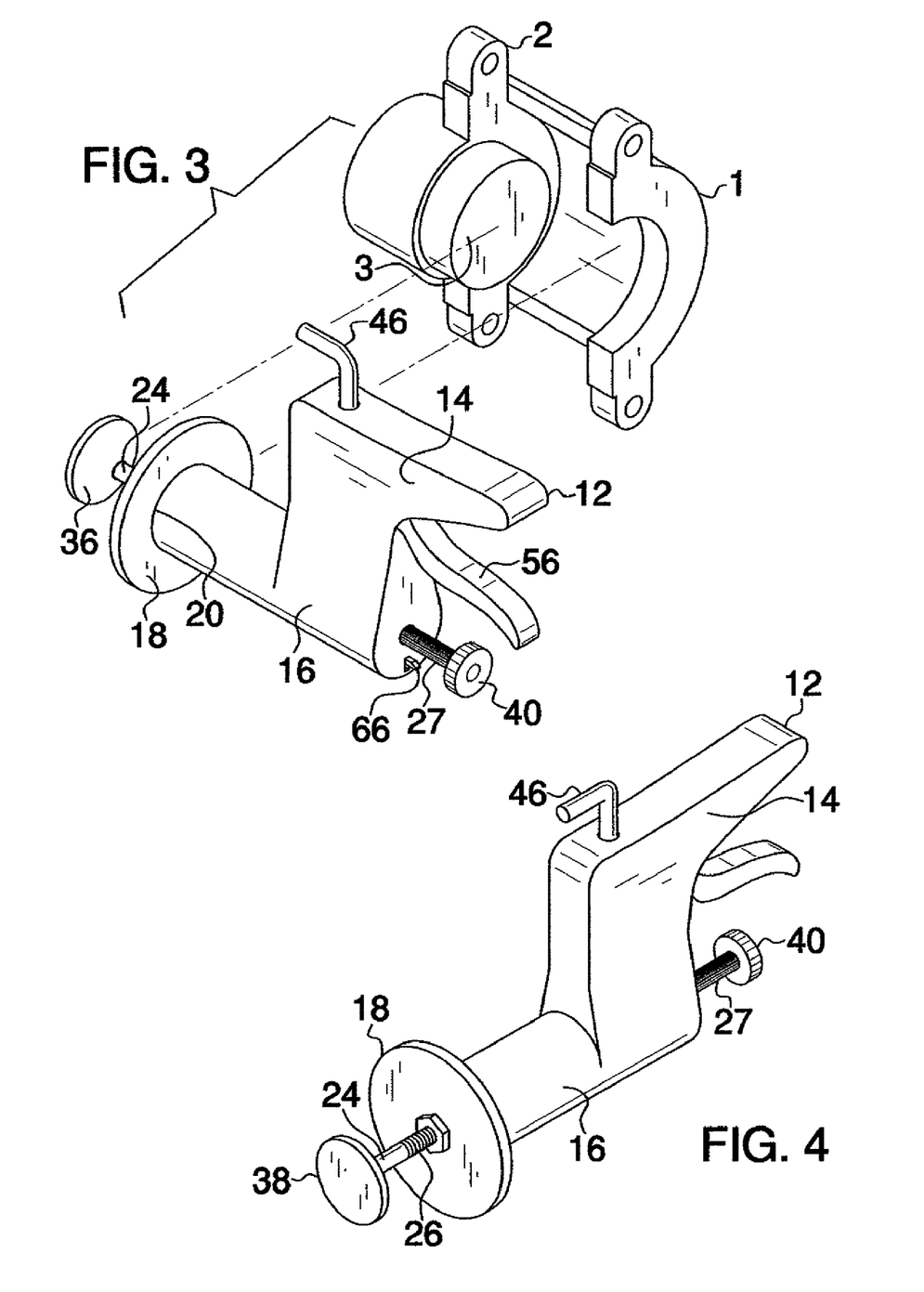
FIG. 3 is a perspective view of the present invention shown exploded away from the brake caliper.
FIG. 4 is a perspective view of the present invention.
Figure 5:
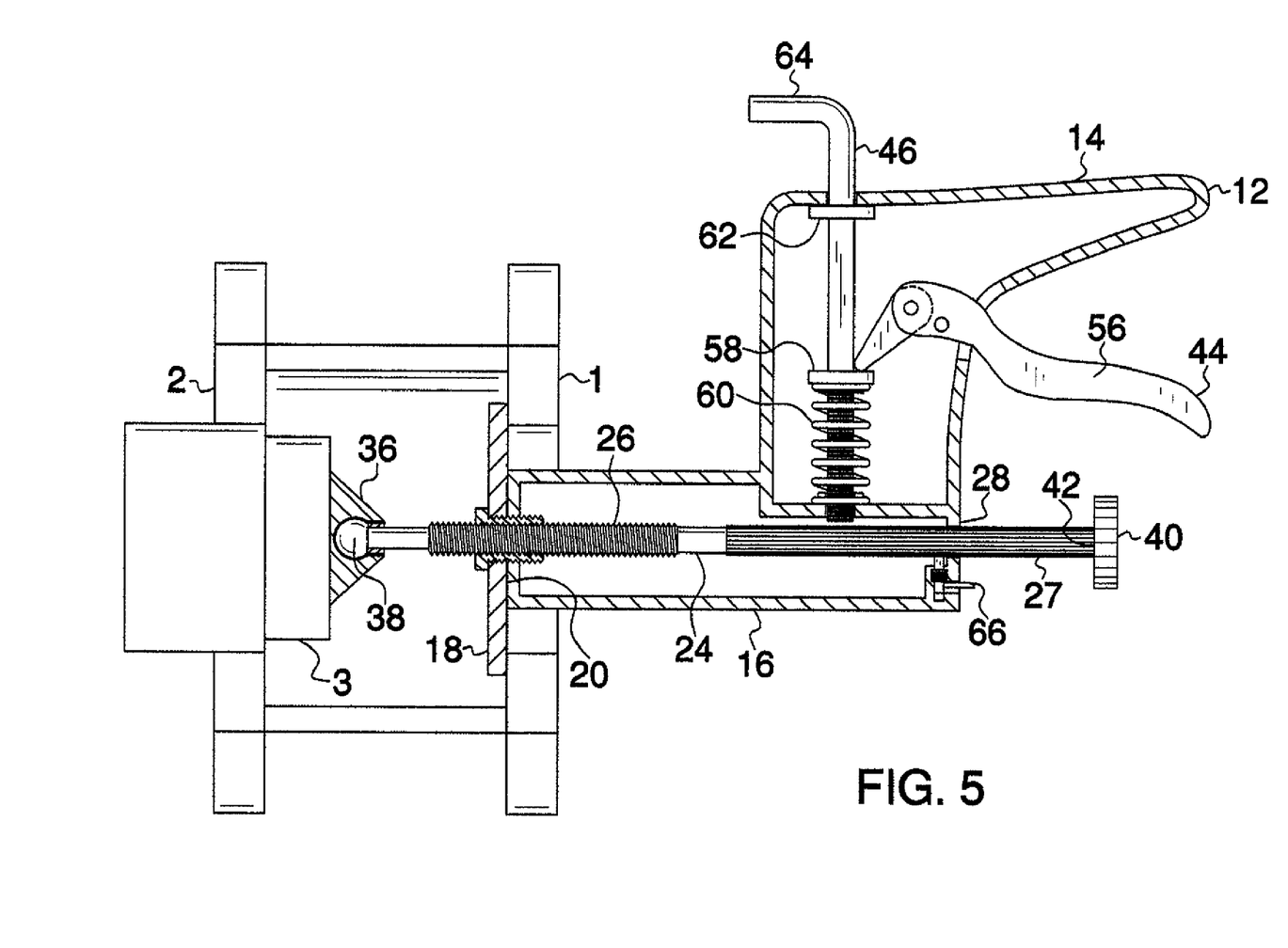
FIG. 5 is a cross-sectional view of the present invention taken along line 5-5 of FIG. 1.
Figure 6:
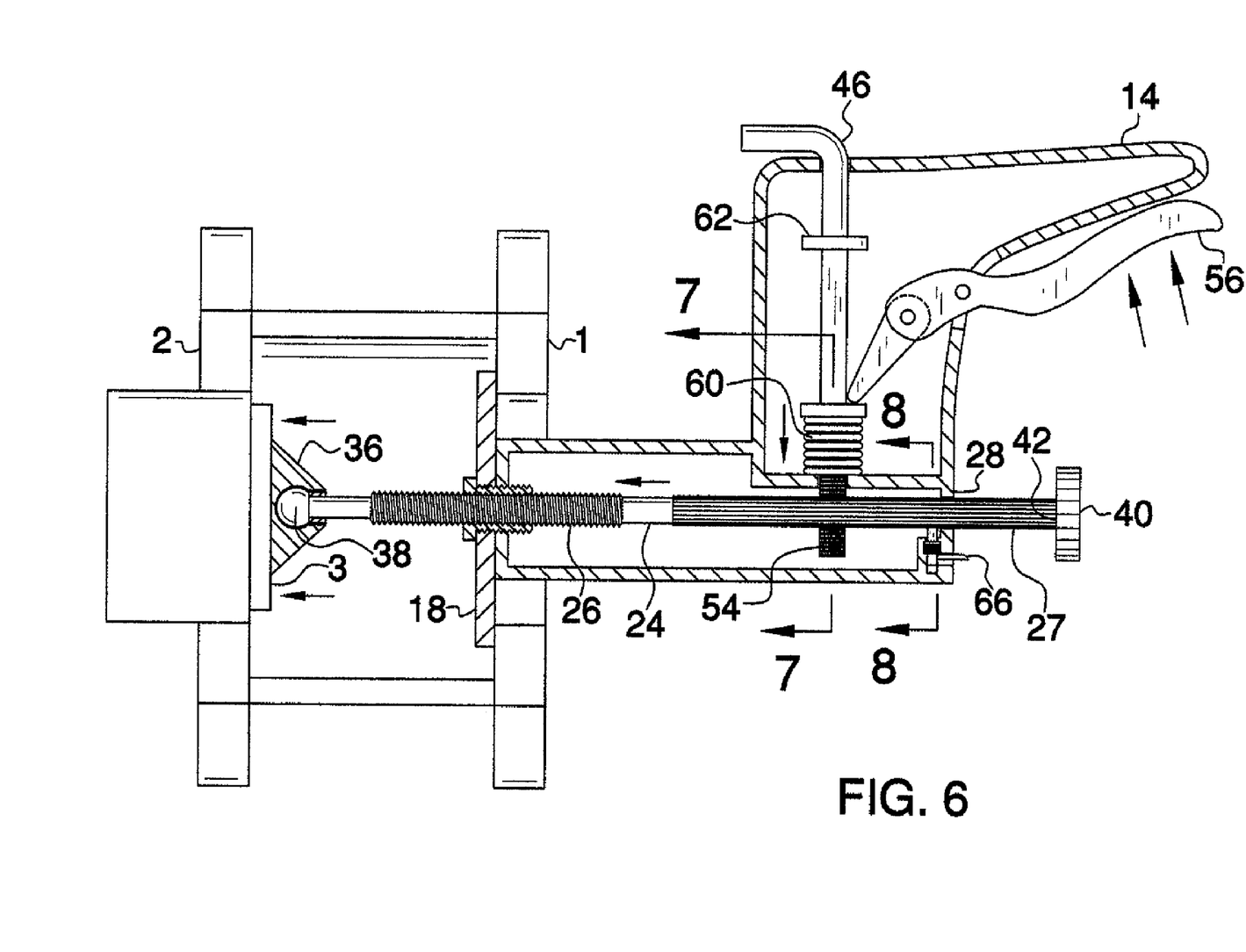
FIG. 6 is the cross-sectional view of the present invention actuated to push the brake piston into the brake caliper.
Figure 7:
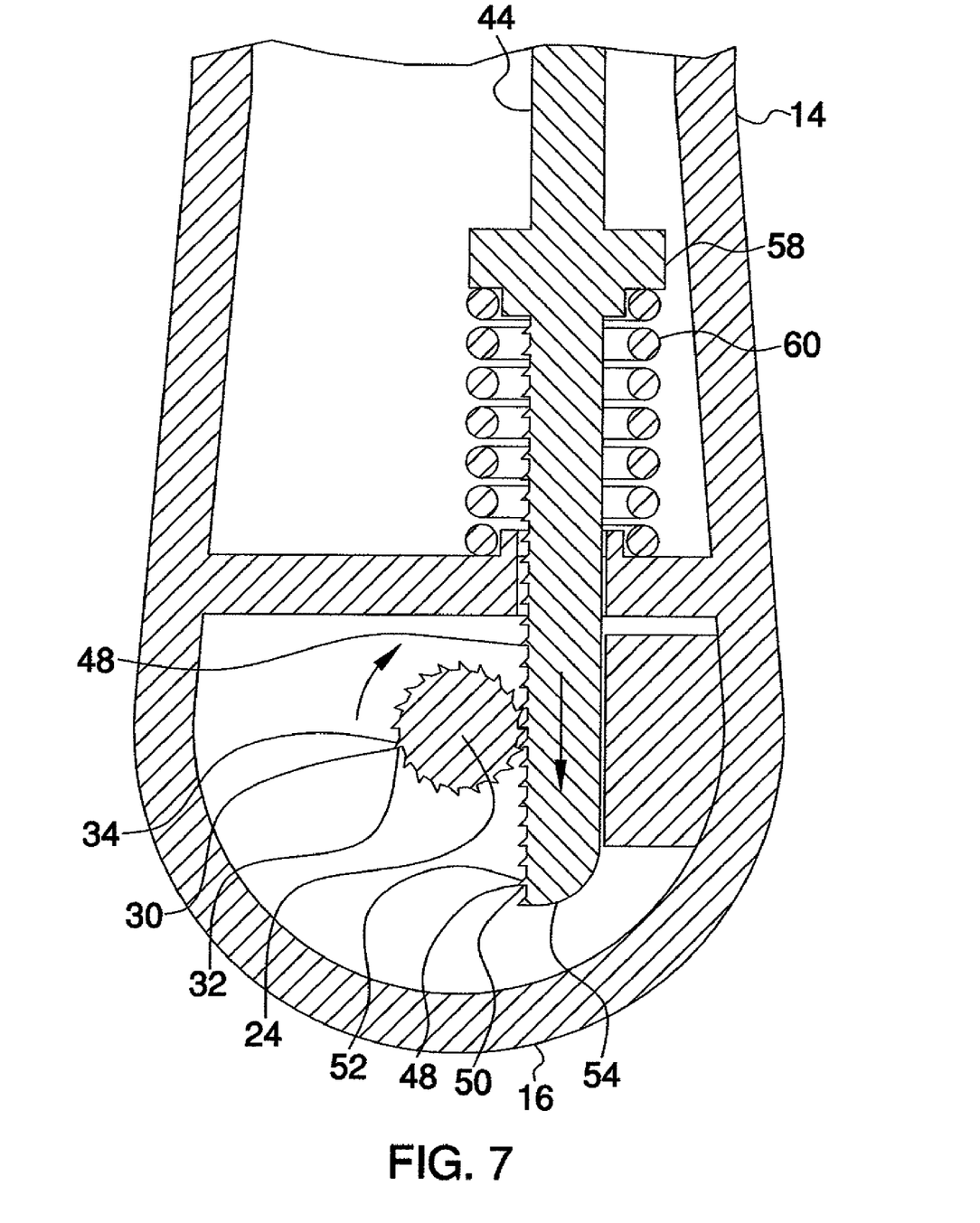
FIG. 7 is a cross-sectional view of the present invention taken along lien 7-7 of FIG. 6.
Figure 8:
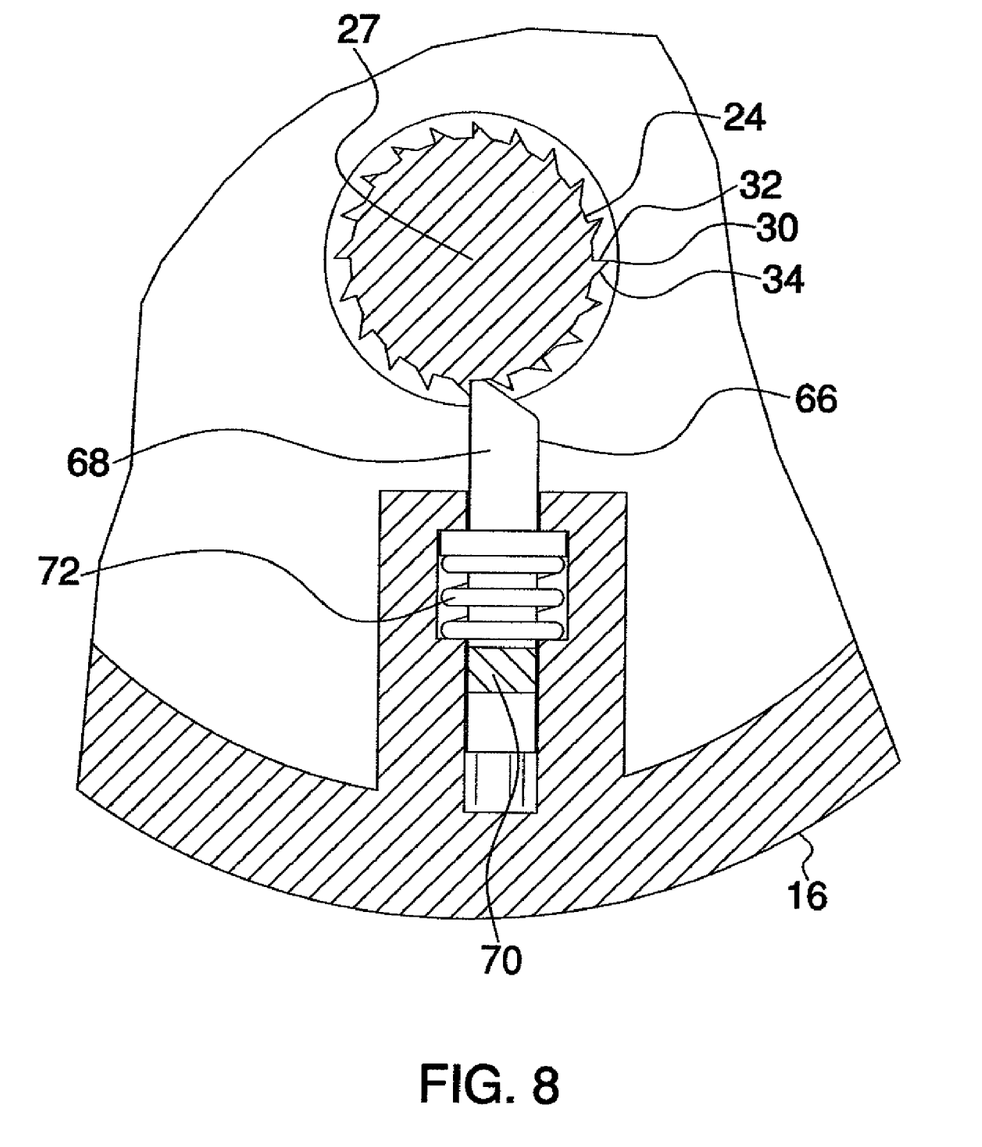
FIG. 8 is a cross-sectional view of the present invention taken along line 8-8 of FIG. 6.
Figure 9:
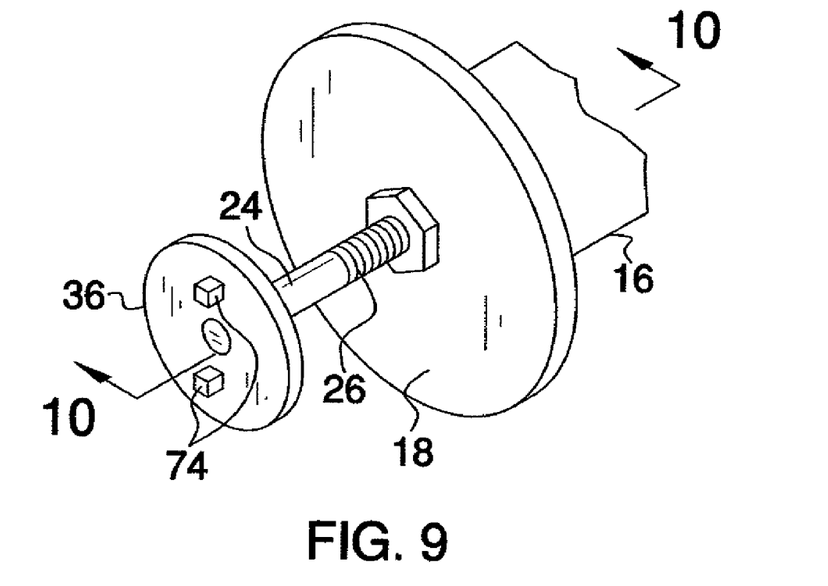
FIG. 9 is a perspective view of an embodiment of the abutment plate of the present invention.
Figure 10:
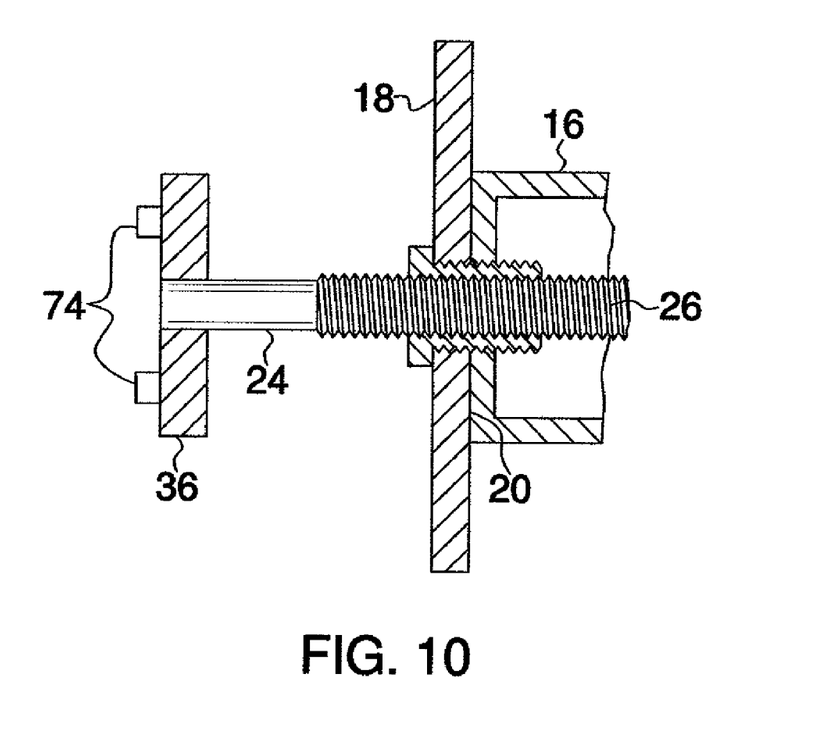
FIG. 10 is a cross-sectional view of the embodiment of the present invention taken along line 10-10 of FIG. 9.

In an embodiment, as shown in FIGS. 9 and 10, a plurality of indexing tabs 74 is coupled to and outwardly extends from the abutment plate 36. The indexing tabs 74 are positioned in grooves in the brake piston 3 to maintain positioning of the abutment plate 36 with respect to the brake piston 3 when the abutment plate 36 abuts the brake piston 3.

In use, the brake piston 3 is placed in the brake caliper 2. The baking plate is positioned against the front plate 1 of the brake caliper 2 and the abutment plate 36 is positioned against the brake piston 3. As the trigger 56 is actuated the rod 24 is advanced to drive the abutment plate 36 away from the backing plate 18 and to drive the brake piston 3 into the brake caliper 2. The restricting assembly 66 is actuated to allow the grip 40 to be grasped and rotate the rod 24 in the second direction to retract the abutment plate 36 from the brake piston 3 and allow the backing plate 18 to be removed from the front plate 1.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A brake piston system for setting a brake piston in a brake caliper, said system comprising:
   a housing including a handle section and a main section being coupled to said handle section, said handle section being graspable by a person, said main section being positioned approximately perpendicular to said handle section;
   a backing plate being coupled to a front end of said housing, said backing plate being abutted against a front plate of the brake caliper;
   a ram assembly being mounted to said housing and extending through said backing plate, said ram assembly being abuttable against the brake piston of the brake caliper when said backing plate is abutted against the front plate, said ram assembly being actuated to push against the brake piston and force the brake piston into the brake caliper, said ram assembly including;
      a rod extending through said main section of said housing, said rod including a threaded section and a toothed section, said threaded section being threaded through said backing plate and said front end of said housing, said toothed section extending through a rear end of said housing;
      an abutment plate being pivotally coupled to a forward end of said rod, said abutment plate being abutted against the brake piston when said backing plate is abutted against the front plate of the brake caliper, said abutment plate being advanced away from said backing plate to force the brake piston into the brake caliper when said rod is rotated in a first direction, said abutment plate being retracted towards said backing plate when said rod is rotated in a second direction; and
   an actuation assembly being coupled to said housing, said actuation assembly being actuated to actuate said ram assembly to advance the brake piston into the brake caliper, said actuation assembly being coupled to said handle section of said housing, said actuation assembly including an advancing bar being slidably coupled to said housing, said advancing bar including a plurality of pawl teeth, said pawl teeth meshing with said toothed section of said rod to rotate said rod in the first direction when said advancing bar is slid towards said rod, said pawl teeth sliding over said toothed section when said advancing bar is slid away from said rod.

2. The system according to claim 1, wherein said ram assembly includes a plurality of indexing tabs being coupled to and outwardly extending from said abutment plate, said indexing tabs being positioned in grooves in the brake piston to maintain positioning of the abutment plate with respect to the brake piston when said abutment plate abuts the brake piston.

3. The system according to claim 1, wherein said ram assembly includes a grip being coupled to a rearward end of said rod opposite said abutment plate, said grip being rotated to rotate said rod in the second direction when said abutment plate is to be retracted from the brake piston.

4. The system according to claim 1, wherein said actuation assembly includes a trigger being pivotally coupled to said housing, said trigger being pivotally coupled to and extending through said handle section, said trigger abutting against said advancing bar, said trigger sliding said advancing bar toward said rod when said trigger is actuated.

5. The system according to claim 4, wherein said actuation assembly includes an urging member being coupled to said advancing bar and extending between said advancing bar and said housing, said urging member urging said advancing bar away from said rod when said trigger is released.

6. The system according to claim 1, further comprising a restricting assembly being coupled to said housing, said restricting assembly inhibit retraction of said ram assembly from the brake piston, said restricting assembly being actuated to permit said ram assembly to be retracted from the brake piston.

7. The system according to claim 6, wherein said restricting assembly includes a pawl being slidably coupled to said housing, said pawl abutting against said toothed section of said rod to inhibit rotation of said rod in the second direction.

8. The system according to claim 7, wherein said restricting assembly includes a retraction bar being coupled to said pawl and extending from said housing, said retraction bar sliding said pawl away from said rod to permit rotation of said rod in the second direction when retraction bar is actuated.

9. The system according to claim 8, wherein said restricting assembly includes a biasing member being coupled to said pawl and extending between said pawl and said housing, said biasing member biasing said pawl against the toothed section of the rod when said retraction bar is released.

10. A brake piston system for setting a brake piston in a brake caliper, said system comprising:
  a housing including a handle section and a main section being coupled to said handle section, said handle section being graspable by a person, said main section being positioned approximately perpendicular to said handle section;
  a backing plate being coupled to a front end of said housing, said backing plate being abutted against a front plate of the brake caliper;
  a ram assembly being mounted to said housing and extending through said backing plate, said ram assembly being abuttable against the brake piston of the brake caliper when said backing plate is abutted against the front plate, said ram assembly being actuated to push against the brake piston and force the brake piston into the brake caliper, said ram assembly comprising;
    a rod extending through said main section of said housing, said rod including a threaded section and a toothed section, said threaded section being threaded through said backing plate and said front end of said housing, said toothed section extending through a rear end of said housing;
    an abutment plate being pivotally coupled to a forward end of said rod, said abutment plate being abutted against the brake piston when said backing plate is abutted against the front plate of the brake caliper, said abutment plate being advanced away from said backing plate to force the brake piston into the brake caliper when said rod is rotated in a first direction, said abutment plate being retracted towards said backing plate when said rod is rotated in a second direction;
    a grip being coupled to a rearward end of said rod opposite said abutment plate, said grip being rotated to rotate said rod in the second direction when said abutment plate is to be retracted from the brake piston;
  an actuation assembly being coupled to said housing, said actuation assembly being actuated to actuate said ram assembly to advance the brake piston into the brake caliper, said actuation assembly being coupled to said handle section of said housing, said actuation assembly comprising;
    an advancing bar being slidably coupled to said housing, said advancing bar including a plurality of pawl teeth, said pawl teeth meshing with said toothed section of said rod to rotate said rod in the first direction when said advancing bar is slid towards said rod, said pawl teeth sliding over said toothed section when said advancing bar is slid away from said rod;
    a trigger being pivotally coupled to said housing, said trigger being pivotally coupled to and extending through said handle section, said trigger abutting against said advancing bar, said trigger sliding said advancing bar toward said rod when said trigger is actuated;
    an urging member being coupled to said advancing bar and extending between said advancing bar and said housing, said urging member urging said advancing bar away from said rod when said trigger is released;
  a restricting assembly being coupled to said housing, said restricting assembly inhibit retraction of said ram assembly from the brake piston, said restricting assembly being actuated to permit said ram assembly to be retracted from the brake piston, said restricting assembly comprising;
    a pawl being slidably coupled to said housing, said pawl abutting against said toothed section of said rod to inhibit rotation of said rod in the second direction;
    a retraction bar being coupled to said pawl and extending from said housing, said retraction bar sliding said pawl away from said rod to permit rotation of said rod in the second direction when retraction bar is actuated; and
    a biasing member being coupled to said pawl and extending between said pawl and said housing, said biasing member biasing said pawl against the toothed section of the rod when said retraction bar is released.

11. A brake piston system for setting a brake piston in a brake caliper, said system comprising:
  a housing including a handle section and a main section being coupled to said handle section, said handle section being graspable by a person, said main section being positioned approximately perpendicular to said handle section;
  a backing plate being coupled to a front end of said housing, said backing plate being abutted against a front plate of the brake caliper;
  a ram assembly being mounted to said housing and extending through said backing plate, said ram assembly being abuttable against the brake piston of the brake caliper when said backing plate is abutted against the front plate, said ram assembly being actuated to push against the brake piston and force the brake piston into the brake caliper, said ram assembly including;

a rod extending through said main section of said housing, said rod including a threaded section and a toothed section, said threaded section being threaded through said backing plate and said front end of said housing, said toothed section extending through a rear end of said housing;

an abutment plate being pivotally coupled to a forward end of said rod, said abutment plate being abutted against the brake piston when said backing plate is abutted against the front plate of the brake caliper, said abutment plate being advanced away from said backing plate to force the brake piston into the brake caliper when said rod is rotated in a first direction, said abutment plate being retracted towards said backing plate when said rod is rotated in a second direction;

an actuation assembly being coupled to said housing, said actuation assembly being actuated to actuate said ram assembly to advance the brake piston into the brake caliper, said actuation assembly being coupled to said handle section of said housing;

a restricting assembly being coupled to said housing, said restricting assembly inhibit retraction of said ram assembly from the brake piston, said restricting assembly being actuated to permit said ram assembly to be retracted from the brake piston, said restricting assembly including;

a pawl being slidably coupled to said housing, said pawl abutting against said toothed section of said rod to inhibit rotation of said rod in the second direction; and a retraction bar being coupled to said pawl and extending from said housing, said retraction bar sliding said pawl away from said rod to permit rotation of said rod in the second direction when retraction bar is actuated.

12. The system according to claim 11, wherein said ram assembly includes a plurality of indexing tabs being coupled to and outwardly extending from said abutment plate, said indexing tabs being positioned in grooves in the brake piston to maintain positioning of the abutment plate with respect to the brake piston when said abutment plate abuts the brake piston.

13. The system according to claim 11, wherein said ram assembly includes a grip being coupled to a rearward end of said rod opposite said abutment plate, said grip being rotated to rotate said rod in the second direction when said abutment plate is to be retracted from the brake piston.

14. The system according to claim 11, wherein said actuation assembly includes:

an advancing bar being slidably coupled to said housing, said advancing bar including a plurality of pawl teeth, said pawl teeth meshing with said toothed section of said rod to rotate said rod in the first direction when said advancing bar is slid towards said rod, said pawl teeth sliding over said toothed section when said advancing bar is slid away from said rod; and a trigger being pivotally coupled to said housing, said trigger being pivotally coupled to and extending through said handle section, said trigger abutting against said advancing bar, said trigger sliding said advancing bar toward said rod when said trigger is actuated.

15. The system according to claim 14, wherein said actuation assembly includes an urging member being coupled to said advancing bar and extending between said advancing bar and said housing, said urging member urging said advancing bar away from said rod when said trigger is released.

16. The system according to claim 11, wherein said restricting assembly includes a biasing member being coupled to said pawl and extending between said pawl and said housing, said biasing member biasing said pawl against the toothed section of the rod when said retraction bar is released.

* * * * *